United States Patent [19]

Sivaslian

[11] 3,804,394
[45] Apr. 16, 1974

[54] SHOCK STRUT

[75] Inventor: Armen H. Sivaslian, Newport Beach, Calif.

[73] Assignee: North American Rockwell Corporation

[22] Filed: May 30, 1972

[21] Appl. No.: 257,503

[52] U.S. Cl. .................................................. 267/34
[51] Int. Cl. .......................................... F16f 5/00
[58] Field of Search ........................... 267/64 R, 34

[56] References Cited
UNITED STATES PATENTS
3,447,797   6/1969   Roberts ........................... 267/64 R
3,391,922   7/1968   Axthammer ..................... 267/64 R Primary Examiner—James B. Marbert
Attorney, Agent, or Firm—H. Fredrick Hamann; George Jameson; Rolf M. Pitts

[57] ABSTRACT

The present invention is a shock strut which is particularly adapted to being connected between two ball shafts, one ball shaft connected to the object to be supported and the other connected to the support such as a vehicle frame. At rest, a single compression spring forces an associated pair of seats against opposing sides of the spherical portion of each ball shaft and forces two cylindrical links to seat together in order to precisely re-position the shock strut with respect to an initial preselected position. A novel load splitter contacts one end of the spring and divides the force of the spring along two paths. One path compresses one seat against the spherical portion of one ball shaft and the other compresses another seat against the spherical portion of the other ball shaft as well as causing the two cylindrical links to seat together.

5 Claims, 8 Drawing Figures

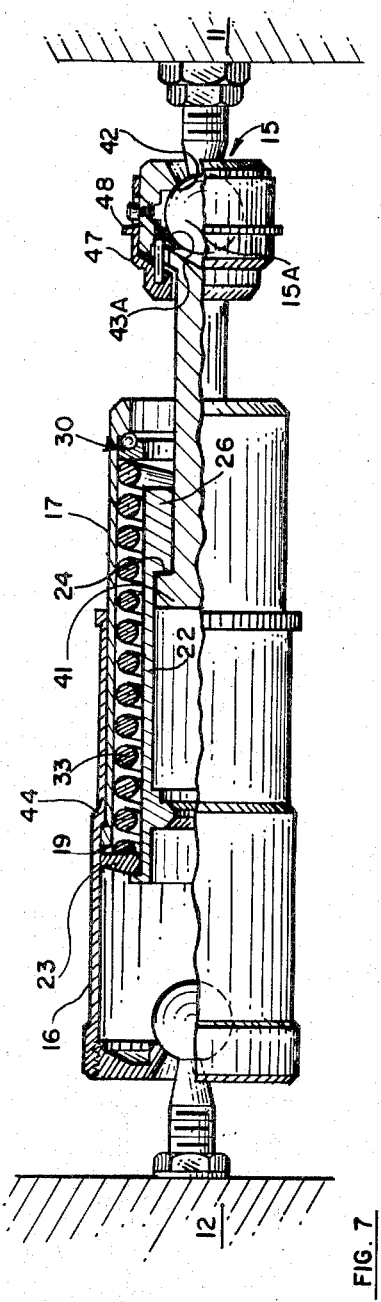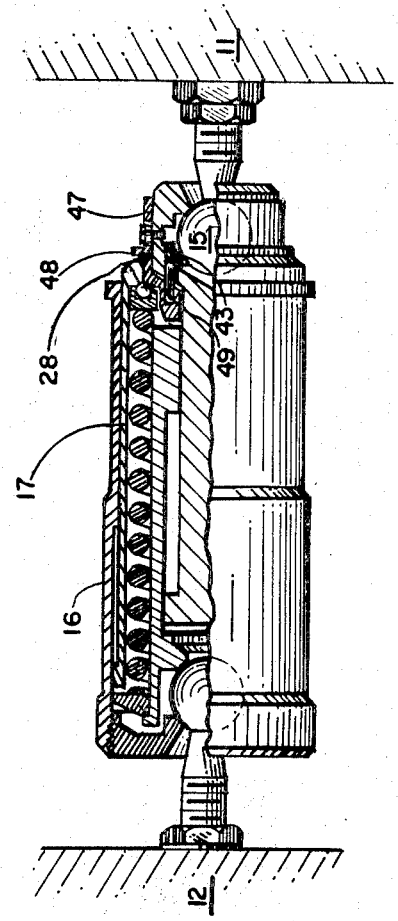

3,804,394

SHOCK STRUT

BACKGROUND OF THE INVENTION

Shock struts have been used to position precision instruments in environments, such as moving vehicles, in such a manner as to prevent damage to the precision instrument. Oftentimes, the instrument must be held in a rigid exacting position within the vehicle. For example, an autonavigator in a submarine may be rigidly secured to the submarine hull in accordance with design criteria to provide a common reference alignment with other systems. Unfortunately, the packaging design features of the precision, and often fragile, components of the autonavigator are incompatible with the severe stress encountered. Thus, in a submarine having an autonavigator rigidly attached to its hull, shock forces transmitted through the hull, such as those resulting from depth charges or sudden changes in course, are transmitted directly through the rigid mounting to the autonavigator components. These precision components are unable to withstand the severe shock and often suffer extreme damage.

Some prior art mounting systems have utilized resilient shock absorbing devices such as rubber mounts and pressurized fluid mounts to absorb the shock received by a supporting frame. However, in some systems, such as a precision autonavigator instrument in a submarine, the reliability of operation depends upon a rigid mounting and, therefore, resilient shock absorbers are unsatisfactory.

One prior art solution to this problem is disclosed in U.S. Pat. No. 3,131,903, entitled "Frangible and Resilient Mounting System," by William H. Quick, which patent is assigned to North American Rockwell Corporation, the assignee of the present invention and now known as Rockwell International Corporation. The mount disclosed in that patent is held rigid for shock forces occurring below a predetermined force level and for forces above a predetermined level the mount becomes active, resiliently supporting the device to a frame to protect the components in the device from excessive shock. The device of the referenced patent utilizes a shock absorber in which two springs are used. Two undesirable features appear in this prior art device. One is the extreme length occurring because of the need for two springs. The other is that there is a possibility of lost motion (axial end-play) in the two supporting pivots or swivels used with the prior art device. These two variables can cause a misalignment of the autonavigator beyond allowable limits which, in turn, will cause an error in the indicated position of the submarine or vehicle in which the autonavigator is mounted.

A prior art device which attempts to solve the problem of positive positioning after the occurrence of a shock force which shock force has a level high enough to activate the shock mount is disclosed in U.S. Pat. No. 2,974,943, entitled "Shock Mount," by Vernon G. Ames. In the prior art device of that patent there is utilized a conical member which is connected to the item to be supported and which conical member is preloaded by the use of two springs and moves up or down an incline formed by the walls of the outer case of the shock mount. Forces acting on the conical member perpendicular to the conical axis, which forces create in-play, can easily move the conical member out of alignment thereby creating an intolerable error. In addition, the use of a Clevis type mount does not allow the supported element to perform a translational movement out of the plane of the paper.

It, therefore, would be highly desirable to have a shock strut which provides a universal swivel at both ends, both of which are axially loaded, to entirely eliminate end-play while utilizing only a single spring in order to minimize the overall length of the device.

SUMMARY OF THE INVENTION

The present invention is directed to a precision positioning shock strut for mounting objects in a predetermined position on a support in an accurate position while allowing displacement of the object when the object is subjected to a shock above a safe predetermined value. A pair of ball shaft members are affixed, one to the object and one to the support, with a spherical portion of each of the ball shaft projecting from the surfaces of the object and support. Two hollow cylindrical housing members and an outer cylindrical link fit within each other such that they can telescope outwards but are limited by limiting means projecting from the second and cylindrical housing member and the outer cylindrical link such that they are retained within the first cylindrical housing member for a limited distance. The first housing member has affixed to one end thereof a seating surface formed to engage one part of the spherical portion of the first ball shaft, which part is facing towards the object to be supported. The outer cylindrical link has a seat formed in its end for seating against another part of the spherical portion of the first ball shaft opposite to the one part facing the object. A shaft or inner cylindrical link having a bearing surface formed on its extended end which bearing surface seats against one part of a spherical portion of the second ball shaft, which part faces the support. The shaft slidably fits within the outer cylindrical link and at its opposite end has a limiting means to prevent its complete withdrawal from within the outer cylindrical link. A slidable cylindrical member and spherical seat ring assembly is interconnected with the bearing surface at the end of the shaft such that the spherical seat ring contacts another part of the spherical portion of the second ball shaft opposite to the part facing the support. A slidable ring is mounted within the second hollow cylindrical housing member and retained for limited motion within the second member. The ring projects inwards a distance sufficient to enable contact with the slidable cylindrical member on the shaft when the shaft is not extended. A single compression spring encircles the outer cylindrical link within the first and second hollow cylindrical housing members with one end of the spring pushing against the slidable ring and the other end of the spring pushing against the limiting means of the outer cylindrical link.

From the foregoing, it can be seen that it is an object of the present invention to provide an improved shock strut.

Another object of the present invention is to provide a shock strut which utilizes only a single spring.

Another object of the present invention is to provide a shock strut which is substantially rigid below a preselected shock force and which is resilient above the predetermined shock force.

Another object of the present invention is to provide a shock absorber which, upon the removal of the disturbing shock, returns to its original preset position with an extremely high degree of accuracy.

A further object of the present invention is to provide a shock strut which provides a universal swivel at both ends, both of which are axially loaded, to entirely eliminate end-play while utilizing only a single spring in order to minimize the overall length of the device.

These and other objects of the present invention will become more apparent when taken in conjunction with the following description and drawings, which drawings form a part of the present application.

BRIEF DESCRIPTION OF THE DRAWINGS

FIG. 7 is a partially sectioned view of the device shown in FIG. 1 under extension loads; and FIG. 8 is a partially sectioned view of the shock strut of FIG. 1 under compression loads.

DESCRIPTION OF THE PREFERRED EMODIMENT

Figure 1:
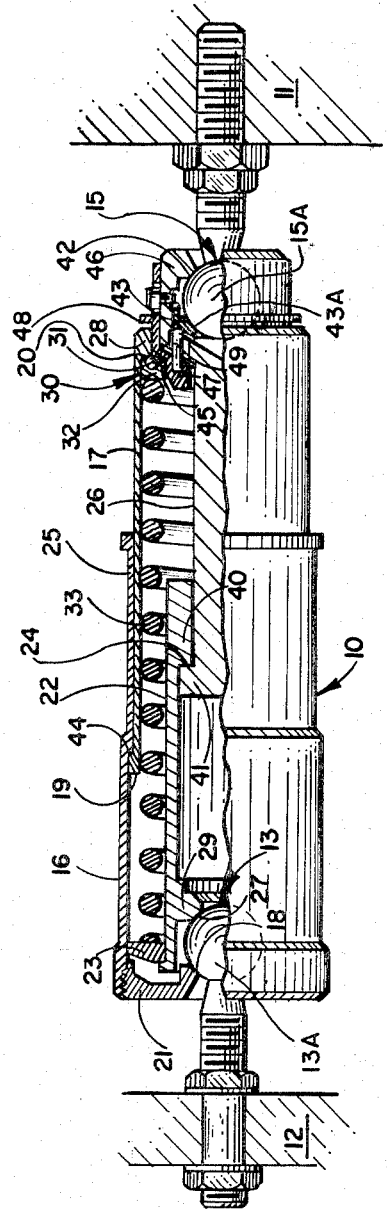
FIG. 1 is a partially sectioned elevation view of the preferred embodiment of the invention affixed in place and absent a shock load.

Referring to FIG. 1, the shock strut device 10 is adapted to be connected between an object 12 and a support 11. Fixedly attached to the object 12 is a ball shaft 13. A similar ball shaft 15 is firmly attached to the support 11. An outer cylindrical housing 16 is partially closed off at one end by a base member 21 which forms a spherical seat 18 that abuts against a spherical portion 13A of the ball shaft 13 which portion faces the object 12. The outer cylindrical housing 16 abruptly reduces in diameter to form cylindrical member 25 having an inward projecting ridge 44. An inner cylindrial housing 17, having a diameter which allows a slidable fit with the inner diameter of the cylindrical member 25, contains at one end a projecting ridge 19 which ridge limits the amount of travel that the inner cylindrical housing 17 can move out with respect to the outer cylindrical housing 16. At the opposite end of the inner cylindrical housing 17 is an inward projecting ridge 28 forming a seat 20. Referring to both of FIG. 1 and 2, a force splitter 30 is comprised of a slidable ring 32 having a notch 35 cut therein into which is placed a plurality of steel balls 31. A helical spring 33 is helically wound around the inner surfaces of inner and outer cylindrical housing 16 and 17. One end of spring 33 pushes against the slidable ring 32 of force splitter 30. An outer cylindrical link 22 has connected at one end an outward projecting ridge 23 which slidably contacts the inner wall of the outer cylindrical housing 16 and on which rests the opposite end of spring 33. Projecting inward from the outer cylindrical link 22 is a ridge 29 which forms a seat 27 which seat normally rests on one side of the spherical portion 13A of the ball shaft 13 which portion is located opposite to the portion facing object 12. A second inner projection 40 forms a ridge surface seat 24 at the opposite end of the outer cylindrical link 22. A shaft or inner cylindrical link 26 is slidably mated with the bearing surface formed by the inner projection 40 and at the end of the shaft 26 there is formed an outward projecting ridge 41 which, in the farthest limit of travel abuts against the ridge surface seat 24. Integral with the opposite end of the shaft 26 is an inward projecting ridge 46 which forms a spherical seat 42 which rests on a spherical portion 15A of the ball shaft 15 facing the support element 11. A slidable cylindrical member 47 is interconnected with the inward projecting ridge 46 and operates through a plurality of dowels 49 to force a spherical seat ring 43 which forms a spherical seat 43A against the spherical portion 15A of the ball shaft 15 that faces away from the support 11. An outward projecting ridge 48, affixed to the slidable cylindrical member 47, limits the inward travel of the slidable cylindrical member 47 by butting against the inward projecting ridge 28 of the inner cylindrical housing 17. Accurate repeatability of this positioning of the object 12 with respect to the support 11 is primarily accomplished by forcing the seat 27 of the ridge 29 against one side of the spherical portion 13A of the ball shaft 13, the outward projecting ridge 41 against the seat 24, and the seat 43A against one side of the spherical portion 15A of the ball 15 to essentially form a rigid structure.

Figure 2:
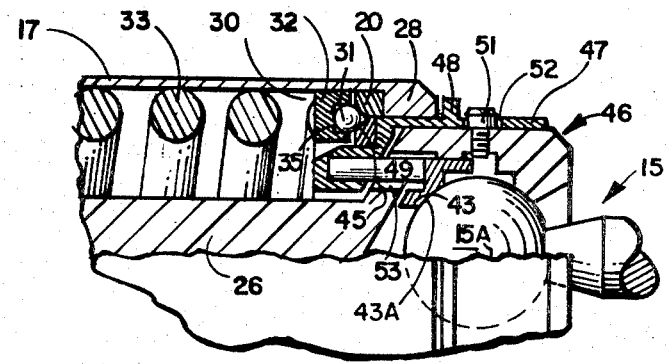
FIG. 2 is an enlarged sectional view illustrating a novel portion of the embodiment of FIG. 1.

Referring now specifically to FIG. 2, which is an exploded view of the force splitter 30 and the slidable cylindrical member 47 of the present invention, wherein the inner cylindrical housing 17 is shown containing the helical spring 33 which spring at its end pushes against the force splitter 30 and specifically the slidable ring 32. The plurality of balls 31 contact the seats 20 and 45 to equally distribute the pressure of the spring to each of these seats. The plurality of dowels 49 extend through openings 53 in the shaft or inner cylindrical link 26. Screws 51 operate in conjunction with the enlarged holes 52 in the slidable cylindrical member 47 to limit its travel. Seat 45 transmits part of the spring 33 force through the dowels 49 to the spherical seat ring 43 to cause it to form the seat 43A with the spherical portion 15A. Seat 20 transmits another part of the spring 33 force to the inward projecting ridge 28.

Figure 3:
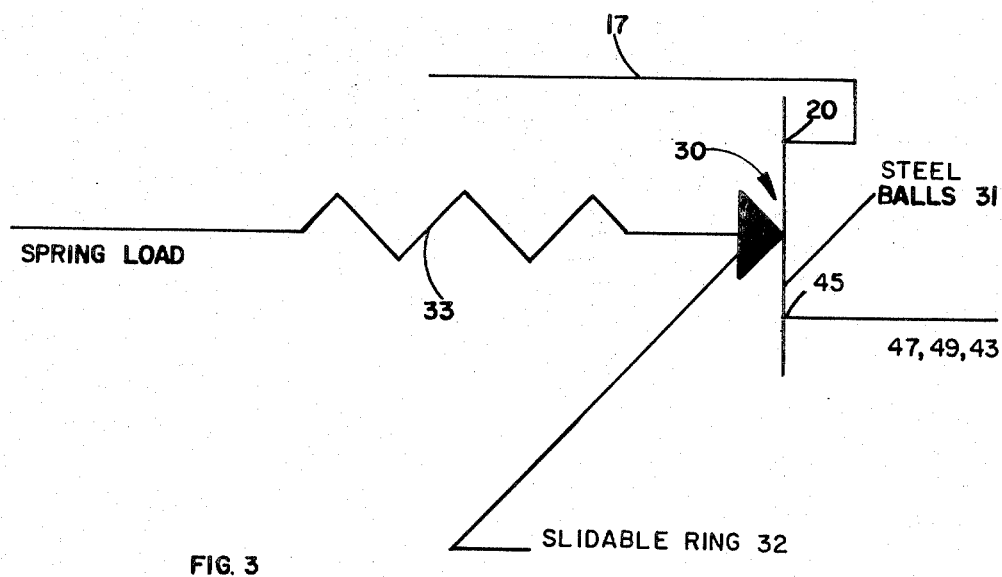
FIG. 3 is a schematic representation of the loading of the novel section shown in FUG. 2.

In FIG. 3, a schematic representation of the loading of the force splitter 30 is shown. The spring 33 presses against the slidable ring 32 which acts as a fulcrum. The slidably ring 32 transmits through the steel balls 31 a balanced force to seats 20 and 45. The steel balls 31 are depicted as a beam. Seats 20 and 45 in turn respectively transmit the pressure from the spring 33 to the inner cylindrical housing 17 and through the slidable cylindrical member 47, the dowels 49 and the spherical seat ring 43 to the seat 43A.

Figure 4:
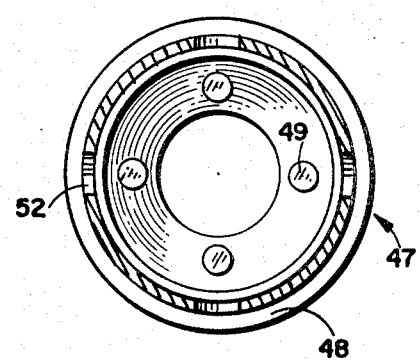
FIG. 4 is a sectioned view of an element used on the preferred embodiment taken along the section lines 4—4 in FIG. 5.
Figure 5:
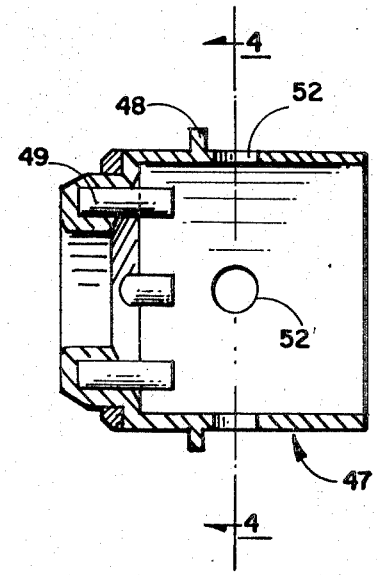
FIG. 5 is a sectioned side view of the element shown in FIG. 4.

Referring now to FIGS. 4 and 5 wherein there is shown an end and a cutaway view of the slidable cylindrical member 47 into the bottom portion of which are mounted the dowels 49 which pass through openings 53 (FIG. 2) in one end of the inner cylindrical link 26 to contact the spherical seat ring 43 so as to force the seat 43A into firm contact with the spherical portion 15A of the ball shaft 15 when under the influence of the force of spring 33, which then brings the spherical portion 15A of the ball shaft 15 into firm contact with the spherical seat 42. Holes 52 are enlarged to accept the guiding screws 51 which screws also retain the slidable cylindrical member 47 onto the inward projecting ridge 46.

Figure 6:
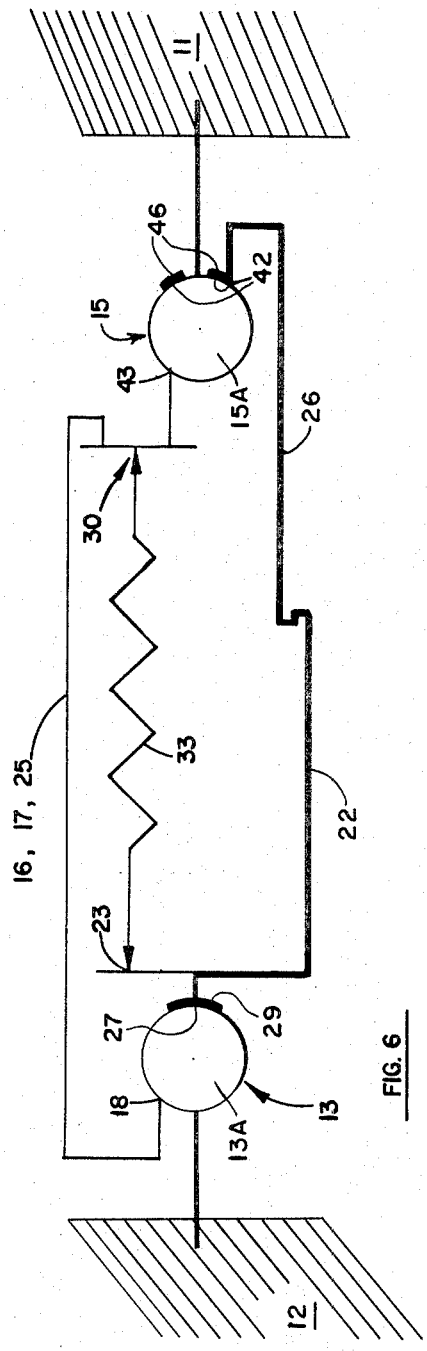
FIG. 6 is a schematic representation of the loading of the shock strut shown in FIG. 1.

Referring now to FIG. 6 wherein the schematic for the entire strut is shown, the single spring 33 is shown at one end pressing against the force splitter 30 and at the other end against the outward projecting ridge 23. In their outermost limits, the outer and inner cylindrical links 22 and 26 being under spring tension can be considered a rigid body. The outer and inner cylindrical housings 16, 17 and 25, also being under spring tension, can also be considered a rigid body. This figure depicts the forces acting when the shock strut is uninfluenced by external shocks. The key feature is that the positioning of the the support 11 and the object 12 is maintained with a tight tolerance to their original relative positions. In other words, after the shock operates to absorb an influencing force on the supported object, the object is returned to its original set position with an accuracy heretofore unobtainable with a one spring unit.

Referring now to FIG. 7 wherein the shock strut 10 is shown in the extended mode, which mode is created by a force being applied to the support 11 of such a magnitude as to overcome the seating force exerted by spring 33. In the preferred embodiment, this force is set at 150 lbs. When this occurs, all the force applied to support 11 is applied through the seat 42 with the seat 43A being disengaged from the spherical portion 15A of the ball shaft 15. The total limit of travel is reached when the projecting ridge 19 seats against the inward projecting ridge 44 and the outward projecting ridge 23 seats upon the projecting ridge 19, with the ridge 41 abutting against the ridge surface seat.

In FIG. 8 there is shown the maximum compression position in which the outer and inner cylindrical housings 16 and 17, as well as outer and inner cylindrical links 22 and 26, are telescoped within each other and the ridge 48 is bottomed against the inward projecting ridge 28.

While there has been shown what is considered to be the preferred embodiment of the invention, it will be manifest that many changes and modifications may be made therein without departing from the essential spirit of the invention. It is intended, therefore, in the annexed claims, to cover all such changes and modifications as may fall within the true scope of the invention.

I claim:

1. A shock strut for mounting an object in a predetermined position on a support and for restoring the position of the object relative to the support after displacement of the object by a shock above a safe predetermined value, said shock strut comprising:

first and second ball shafts respectively affixed to said object and said support, each of said ball shafts having a first portion;

an outer housing, one end of which forms a first seat against a first part of said first portion of said first ball shaft which first part is located on the side of said first ball shaft facing towards said object; the other end of said outer housing having an inward projecting ridge;

an inner housing adapted to slide within said outer housing with one end of said inner housing having an outward projecting ridge for abutting against the inward projecting ridge of said outer housing to limit the extension travel of said inner housing, said inner housing having an inward projecting ridge located at its opposite end;

an outer cylindrical link positioned within said outer and inner housings, said outer link having at one end thereof an outward projecting ridge which ridge slidably contacts the inner surface of said outer housing and an inward projecting ridge for forming a second seat against a second part of said first portion of said first ball shaft, which second part is on the side of said first ball shaft opposite the first part of said first portion and which second seat seats on said first portion when said outer cylindrical link is bottomed within said outer and inner housings, and having at the end opposite said second seat an inner projecting ridge;

a shaft slidably mounted within said outer cylindrical link, a ridge projecting outward from one end of said shaft for engaging said inner projecting ridge of said outer link when said shaft is fully extended, a ridge formed integral with the opposite end of said shaft which forms a third seat to rest against a first part of the first portion of said second ball shaft connected to said support, which first part of said second ball shaft faces said support;

a ring slidably mounted within said inner housing and retained within said inner housing by the housing's inward projecting ridge, said ring projecting inward a distance greater than the inward projecting ridge;

a compression spring encircling the outer cylindrical link inside of said outer and inner housings, with one end of said spring resting against said slidable ring and the other end of said spring resting against the outward projecting ridge of said outer cylindrical link; and means slidably attached to the end of the shaft near said inward projecting ridge for forming a fourth seat against a second part of said first portion of said second ball shaft connected to said support which second part of said second ball shaft is opposite said support, said forming means receiving a portion of the spring force applied to said ring when the shock strut is at rest or in compression.

2. The shock strut according to claim 1 wherein said ring has a groove therein and further comprising a plurality of balls positioned in said groove for distributing after displacement of the object by a shock a first part of the spring force through said inner and outer housings to cause said first seat to force said first portion of said first ball shaft against said second seat and a second part of the spring force through said forming means to force said first portion of said second ball shaft against said third seat and further causing said inner projecting ridge on said outer cylindrical link to abut against said ridge on said shaft.

3. A shock strut for mounting an object in a predetermined position on a support and for restoring the position of the object relative to the support after displacement of the object by a shock above a safe predetermined value, said shock strut comprising:

first and second ball shafts respectively coupled to said object and said support, said first and second ball shafts respectively having first and second portions;

first, second, and third hollow cylindrical members, said second member fitting within said first member, said third member fitting within said second member, limiting means projecting from each of said members to allow said second and third members to telescope from said first member for a limited distance; said first member having a first seat formed on one end for engaging the part of said first portion that faces the object, said third member having a second seat formed at a first end to seat against the part of said first portion that faces away from the object, said third member further having an inner projecting ridge at a second end;

a shaft having a bearing surface formed on its extended end which bearing surface forms a third seat against the portion of said second ball shaft for engaging the part of said second portion that faces the support, a slidable portion interconnected with said bearing surface at the end of said shaft which slidable portion has a fourth seat formed to contact the part of said second portion that faces away from the support; said shaft slidably mounted within said third hollow cylindrical member, an outward projecting ridge on the opposite end of said shaft to limit travel of said shaft in said third cylindrical member;

a ring slidably mounted within said second member and retained within said second member, said ring projecting inwards a distance sufficient to support said slidable portion when said shaft is not extended; and a spring encircling said third member inside of said first and second hollow cylindrical members, one end of said spring pushing against said ring and the other end of said spring pushing against said limiting means of said third member.

4. The shock strut according to claim 3 wherein said ring has a groove therein and further comprising a plurality of balls positioned in said groove so as to selectively distribute a spring force to said seats when the shock strut is at rest or in compression.

5. The shock strut according to claim 3 wherein said ring has a groove therein and further comprising a plurality of balls positioned in said groove for distributing after displacement of the object by a shock a first part of the spring force through said first and second members to cause said first seat to force said first portion against said second seat and a second part of the spring force through said slidable portion to force said second portion against said third seat and further causing said outward projecting ridge to limit the travel of said shaft in said third member.

* * * * *